United States Patent
Zhang et al.

(10) Patent No.: US 12,513,690 B2
(45) Date of Patent: Dec. 30, 2025

(54) SYSTEMS AND METHODS FOR PTRS AND DMRS PORT ASSOCIATION FOR TRANSMISSION OF PUSCH ON MULTIPLE BEAMS

(71) Applicant: Apple Inc., Cupertino, CA (US)

(72) Inventors: Yushu Zhang, Beijing (CN); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 658 days.

(21) Appl. No.: 17/797,279

(22) PCT Filed: Aug. 4, 2021

(86) PCT No.: PCT/CN2021/110456
§ 371 (c)(1),
(2) Date: Aug. 3, 2022

(87) PCT Pub. No.: WO2023/010311
PCT Pub. Date: Feb. 9, 2023

(65) Prior Publication Data
US 2024/0244612 A1 Jul. 18, 2024

(51) Int. Cl.
*H04W 72/232* (2023.01)
*H04L 5/00* (2006.01)
(Continued)

(52) U.S. Cl.
CPC ....... *H04W 72/1268* (2013.01); *H04L 5/0051* (2013.01); *H04L 61/2517* (2013.01);
(Continued)

(58) Field of Classification Search
CPC ............... H04W 72/232; H04L 27/261; H04L 27/2613; H04L 61/2517; H04L 63/0236; H04L 29/0658; H04B 7/06966
See application file for complete search history.

(56) References Cited

U.S. PATENT DOCUMENTS

| | | |
|---|---|---|
| 2019/0312698 A1 | 10/2019 | Akkarakaran et al. |
| 2019/0349964 A1 | 11/2019 | Liou |

(Continued)

FOREIGN PATENT DOCUMENTS

| | | |
|---|---|---|
| CN | 109391571 | 2/2019 |
| CN | 111264036 | 6/2020 |

(Continued)

OTHER PUBLICATIONS

ETSI, "TS 138 212 V16.5.0", Apr. 2021, pp. 1-154 (Year: 2021).*
(Continued)

*Primary Examiner* — Salvador E Rivas
(74) *Attorney, Agent, or Firm* — Brownstein Hyatt Farber Schreck, LLP

(57) ABSTRACT

Systems and methods for associating phase tracking reference signal (PTRS) and demodulation reference signal (DMRS) ports for multi-beam physical uplink shared channel (PUSCH) transmissions are described herein. A base station may provide, to a user equipment (UE), PTRS and DMRS port associations for the multiple beams on which the PUSCH is transmitted. In some cases, a 2-bit downlink control information (DCI) field may be used to alternatively provide single beam or multiple beam PTRS and DMRS port associations to a UE. For non-codebook (NCB) based
(Continued)

transmissions, the UE may alternatively determine PTRS and DMRS port associations for multiple beams independently of any PTRS and DMRS port association indicated in DCI.

20 Claims, 9 Drawing Sheets

(51) Int. Cl.
    *H04L 9/40*         (2022.01)
    *H04L 61/2517*    (2022.01)
    *H04W 72/044*    (2023.01)
    *H04W 72/1268*   (2023.01)
    *H04W 72/231*    (2023.01)
    *H04B 7/06*        (2006.01)

(52) U.S. Cl.
    CPC ....... *H04L 63/0236* (2013.01); *H04W 72/046* (2013.01); *H04W 72/231* (2023.01); *H04W 72/232* (2023.01); *H04B 7/06966* (2023.05)

(56) References Cited

U.S. PATENT DOCUMENTS

| | | | |
|---|---|---|---|
| 2020/0177416 A1* | 6/2020 | Jiang | H04L 27/2613 |
| 2020/0244415 A1* | 7/2020 | Liu | H04L 5/0037 |
| 2020/0313827 A1 | 10/2020 | Hoon-Dong et al. | |
| 2021/0168006 A1* | 6/2021 | Chen | H04L 27/2614 |
| 2022/0294590 A1* | 9/2022 | Gao | H04L 5/0053 |
| 2023/0085874 A1* | 3/2023 | Khoshnevisan | H04L 1/189 370/329 |
| 2023/0143852 A1* | 5/2023 | Yu | H04B 7/0404 370/329 |
| 2024/0080156 A1* | 3/2024 | Gao | H04L 5/0035 |

FOREIGN PATENT DOCUMENTS

| | | |
|---|---|---|
| CN | 111512682 | 8/2020 |
| CN | 111512689 | 8/2020 |
| CN | 111971907 | 11/2020 |
| WO | WO 2021087768 | 5/2021 |

OTHER PUBLICATIONS

International Search Report and Written Opinion dated Mar. 28, 2022, PCT/CN2021/110456, 9 pages.
ZTE Draft CR to 38.212 on non-codebook based UL, 3GPP TSG RAN WG1 Meeting #95, R1-1812264, Nov. 12, 2018, 14 pages.
Moderator (Nokia, Nokia Shanghai Bell); "Summary #1 of Multi-TRP PUCCH and PUSCH Enhancements"; 3GPP TSG RAN WG1 #105-e; R1-2106073; e-Meeting, May 19-27, 2021; Agenda item: 8.1.2.1; 81 pgs.

* cited by examiner

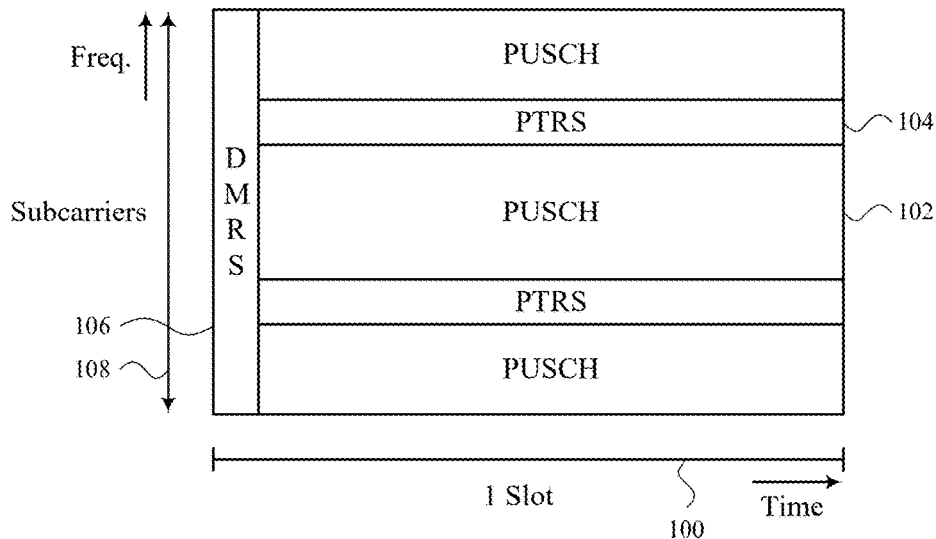

FIG. 1

Table 7.3.1.1.2-25: PTRS-DMRS association for UL PTRS port 0

| Value | DMRS port |
|---|---|
| 0 | 1st scheduled DMRS port |
| 1 | 2nd scheduled DMRS port |
| 2 | 3rd scheduled DMRS port |
| 3 | 4th scheduled DMRS port |

FIG. 2
Prior Art

Table 7.3.1.1.2-26: PTRS-DMRS association for UL PTRS ports 0 and 1

| Value of MSB | DMRS port | Value of LSB | DMRS port |
|---|---|---|---|
| 0 | 1st DMRS port which shares port 0 | 0 | 1st DMRS port which shares port 1 |
| 1 | 2nd DMRS port which shares port 0 | 1 | 2nd DMRS port which shares port 1 |

FIG. 3
Prior Art

SYSTEMS AND METHODS FOR PTRS AND DMRS PORT ASSOCIATION FOR TRANSMISSION OF PUSCH ON MULTIPLE BEAMS

CROSS-REFERENCE TO RELATED APPLICATION

This application is a national phase application under 35 U.S.C. § 371 of PCT/CN2021/110456, filed Aug. 4, 2021, the contents of which are incorporated herein as if fully disclosed herein.

TECHNICAL FIELD

This application relates generally to wireless communication systems, including methods for associating phase tracking reference signal (PTRS) and demodulation reference signal (DMRS) ports for multi-beam physical uplink shared channel (PUSCH) transmissions.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates an example slot of time and frequency resources in which a UE may transmit a PUSCH.

FIG. 2 illustrates Table 7.3.1.1.2-25 of section 7.3.1.1.2 of 3GPP Technical Specification (TS) 38.212.

FIG. 3 illustrates Table 7.3.1.1.2-26 of section 7.3.1.1.2 of 3GPP TS 38.212.

DETAILED DESCRIPTION

Figure 4:
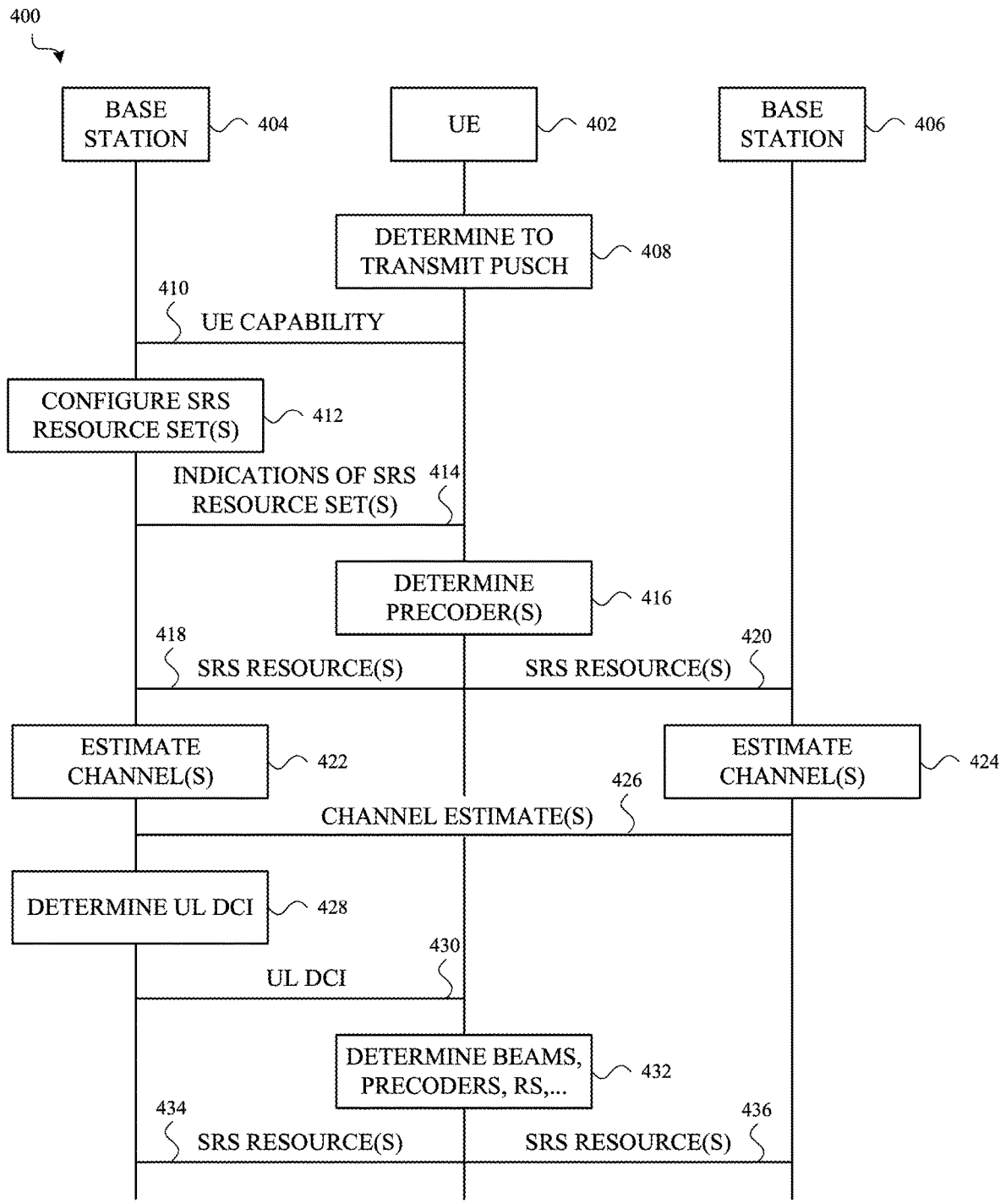
FIG. 4 illustrates an example flow diagram for transmission of a multi-beam PUSCH.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with a network. Therefore, the UE as described herein is used to represent any appropriate electronic device.

FIG. 1 illustrates an example slot 100 of time and frequency resources in which a UE may transmit a PUSCH 102. The UE may also transmit a PTRS 104 and a DMRS 106 within the slot 100 of resources. The DMRS 106 may have a narrow time duration but a wide frequency bandwidth (e.g., the DMRS 106 may be transmitted across many frequencies in as few as one symbol). The PTRS 104 may have a wide time duration but a narrow frequency bandwidth (e.g., the PTRS 104 may be transmitted during many symbols on as few as one frequency subcarrier 108).

A PTRS was introduced in 3GPP Release 15 (Rel-15) as a means to compensate for phase shift in each symbol of a transmission. Phase shift may arise from phase noise, frequency offset, and so on. Often, the phase shift will be common for multiple antenna ports. A receiving device (e.g., a base station in the case of a PUSCH transmission) may compensate for phase shift by estimating a channel response based on a DMRS received from a UE; estimating the channel response based on a PTRS received from the UE; comparing the estimates; and calculating a phase offset, if any, between the DMRS and the PTRS. To ensure that the phase shift compensation is valid, the PTRS and DMRS should share the same quasi-colocation (QCL) property (or precoder).

When transmitting a PUSCH, a UE may be configured with one or two port PTRS. In some cases, a UE that has one antenna panel (e.g., one antenna array) may transmit a one port PTRS, and a UE that has two antenna panels (e.g., two antenna arrays with different phase shift properties) may transmit a two port PTRS.

According to 3GPP Rel-15, each PTRS port should be associated with a DMRS port, such that both ports share the same QCL property (or precoder) with regard to Doppler offset, Doppler shift, frequency offset, frequency shift, and spatial reception (Rx) parameter.

According to 3GPP TS 38.212, sections 7.3.1.1.2 and 7.3.1.1.3, a PTRS and DMRS port association may be indicated by a base station (e.g., a gNB), to a UE, in a field in downlink control information (DCI; e.g., in a 2-bit field in scheduling DCI). Typically, the base station will indicate the strongest DMRS port for association with a PTRS port, so that the best phase noise compensation performance can be achieved.

FIG. 2 illustrates Table 7.3.1.1.2-25 of section 7.3.1.1.2 of 3GPP TS 38.212. The table 200 indicates how different values (i.e., binary encoded values 0-3) of the 2-bit field used to indicate PTRS and DMRS port association should be interpreted for a UE that is transmitting single port PTRS. In particular, the table 200 indicates how a PTRS-DMRS association for a UE's uplink (UL) PTRS port 0 should be interpreted. A value of 0 (or binary 00) indicates that UL PTRS port 0 should be associated with the first scheduled DMRS port of the UE. A value of 1 (or binary 01) indicates that UL PTRS port 0 should be associated with the second scheduled DMRS port of the UE. A value of 2 (or binary 10) indicates that UL PTRS port 0 should be associated with the third scheduled DMRS port of the UE. A value of 3 (or binary 11) indicates that UL PTRS port 0 should be associated with the fourth scheduled DMRS port of the UE.

FIG. 3 illustrates Table 7.3.1.1.2-26 of section 7.3.1.1.2 of 3GPP TS 38.212. The table 300 indicates how the binary bits of the 2-bit field used to indicate PTRS and DMRS port association should be interpreted for a UE that is transmitting dual port PTRS. In particular, the table 200 indicates how a PTRS-DMRS association for a UE's UL PTRS ports 0 and 1 should be interpreted. As shown in table 300, the most significant bit (MSB) and least significant bit (LSB) of the 2-bit field are each associated with a different PTRS port when the UE transmits dual port PTRS. A value of 0 in the MSB indicates that UL PTRS port 0 should be associated with the first scheduled DMRS port that shares PTRS port 0. A value of 1 in the MSB indicates that UL PTRS port 0 should be associated with the second scheduled DMRS port that shares PTRS port 0. A value of 0 in the LSB indicates that UL PTRS port 1 should be associated with the first scheduled DMRS port that shares PTRS port 1. A value of 1 in the LSB indicates that UL PTRS port 1 should be associated with the second scheduled DMRS port that shares PTRS port 1.

Because a UE may use different precoders for different DMRS ports, the base station's indication of a PTRS and DMRS port association can help a UE determine what precoder to use for the PTRS port.

In 3GPP Rel-15, two uplink transmission schemes are supported—codebook (CB) based uplink transmissions, and non-codebook (NCB) based uplink transmissions. For a CB based uplink transmission, a base station (e.g., a gNB) selects what uplink precoder a UE should use and indicates the uplink precoder to the UE by means of a transmission precoder matrix indicator (TPMI) and transmission rank indicator (TRI). The UE then uses the TPMI and TRI to identify the uplink precoder from within a predefined codebook stored by the UE.

For an NCB based uplink transmission, a UE may apply different precoders to different sounding reference signal (SRS) resources, and a base station that receives the SRS resources may transmit one or more SRS resource indicators (SRI(s)) to the UE to provide a precoder indication for PUSCH. Each SRS resource may be based on a single port (i.e., a UE can only apply a single layer/port precoder to each SRS resource). Optionally, the base station can provide the UE with a CSI-RS associated with an SRS resource set, from which the UE can derive a precoder for SRS. A precoder applied to a PUSCH transmission should be the same precoder applied to the indicated SRS resource(s). In 3GPP Rel-17, provisions have been made for a UE to transmit a PUSCH on multiple beams (i.e., as a multi-beam PUSCH). The multi-beam PUSCH transmission may be similar to a multiple transmission point (multi-TRP) transmission. A UE may transmit repetitions of the PUSCH on N (e.g., N=2) beams, which may be scheduled in a single DCI, and which may be transmitted to the same or different base stations.

FIG. 4 illustrates an example flow diagram 400 for transmitting a multi-beam PUSCH. By way of example, the multi-beam PUSCH may be transmitted from a UE 402 to one or more base stations 404, 406 (e.g., one or more gNBs), according to an embodiment. A multi-beam PUSCH may also be transmitted in other ways.

To begin, the UE 402 may determine 408 that it has data to transmit and report its capability 410 to a base station 404 (e.g., to a serving cell for the UE 402). In response, the base station 404 may configure 412 one or more SRS resource sets for the UE 402 and transmit one or more indications 414 of the SRS resource set(s) to the UE 402.

After receiving the indications 414, the UE 402 may determine 416 candidate uplink precoders for the different SRS resource sets and transmit precoded SRS resources 418, 420 on one or more beams, to one or more base stations 404, 406. The base stations 404, 406 may receive the precoded SRS resources 418, 420 and estimate 422, 424 channels with the UE 402 based on PTRS and DMRS transmitted with the precoded SRS resources 418, 420. One of the base stations 406 may communicate its channel estimates 426 to the other base station 404, and the other base station 404 (e.g., the serving cell for the UE 402) may select 428 one or more SRS resources for the channels that the base station 404 believes the UE 402 can best transmit a PUSCH on multiple beams. The base station 404 may then transmit UL DCI 430 to the UE 402. The UL DCI 430 may include, for example, SRIs, PTRS and DMRS port associations, TMPIs, and/or TRIs, and so on. The UE 402 may determine 432, based on the UL DCI 430, higher layer signaling (e.g., RRC signaling), and/or locally stored information, a set of beams on which to transmit a multi-beam PUSCH 434, 436, a set of precoders, and associated reference signals (e.g., PTRS and DMRS). The UE's determination may be based on whether the UE 402 is making a CB or NCB based transmission. A UE may also transmit a multiple-beam PUSCH in other ways.

For a multi-beam PUSCH transmission, the best DMRS port(s) may be different for different beams, and different uplink precoders may be used for different beams and/or PUSCH repetitions. A method to indicate the PTRS and DMRS port association for each beam may therefore be needed. Furthermore, a method to indicate the PTRS and DMRS port associations with limited overhead in DCI may be useful. Methods to indicate PTRS and DMRS port associations for both multi-beam CB based PUSCH transmissions and multi-beam NCB based PUSCH transmissions are described.

For a rank<=2 multi-beam CB based or NCB based PUSCH transmission, a base station may indicate PTRS and DMRS port associations, for each of first and second beams on which a UE may transmit PUSCH repetitions, using the 2-bit field already provided in DCI for indicating PTRS and DMRS port associations. The MSB of the 2-bit field may be used to indicate a first PTRS and DMRS port association for the first beam, and the LSB of the 2-bit field may be used to indicate a second PTRS and DMRS port association for the second beam. A first state of each bit may indicate a first PTRS and DMRS port association for a respective beam, and a second state of each bit may indicate a second PTRS and DMRS port association for a respective beam. For example, a value of 0 in the MSB may indicate that a PTRS port of the UE should be associated with a first scheduled DMRS port of the UE when a PUSCH repetition is transmitted on the first beam. A value of 1 in the MSB may indicate that the PTRS port should be associated with the second scheduled DMRS port of the UE when a PUSCH repetition is transmitted on the first beam. A value of 0 in the LSB may indicate that the PTRS port should be associated with the first scheduled DMRS port when a PUSCH repetition is transmitted on the second beam. A value of 1 in the LSB may indicate that the PTRS port should be associated with the second scheduled DMRS port when a PUSCH repetition is transmitted on the second beam.

For a rank>2 multi-beam CB based or NCB based PUSCH transmission, a base station may indicate PTRS and DMRS port associations, for each of first and second beams on which a UE may transmit PUSCH repetitions, in one or more different ways. Some of these ways are described with reference to FIGS. 5 and 6.

Figure 5:
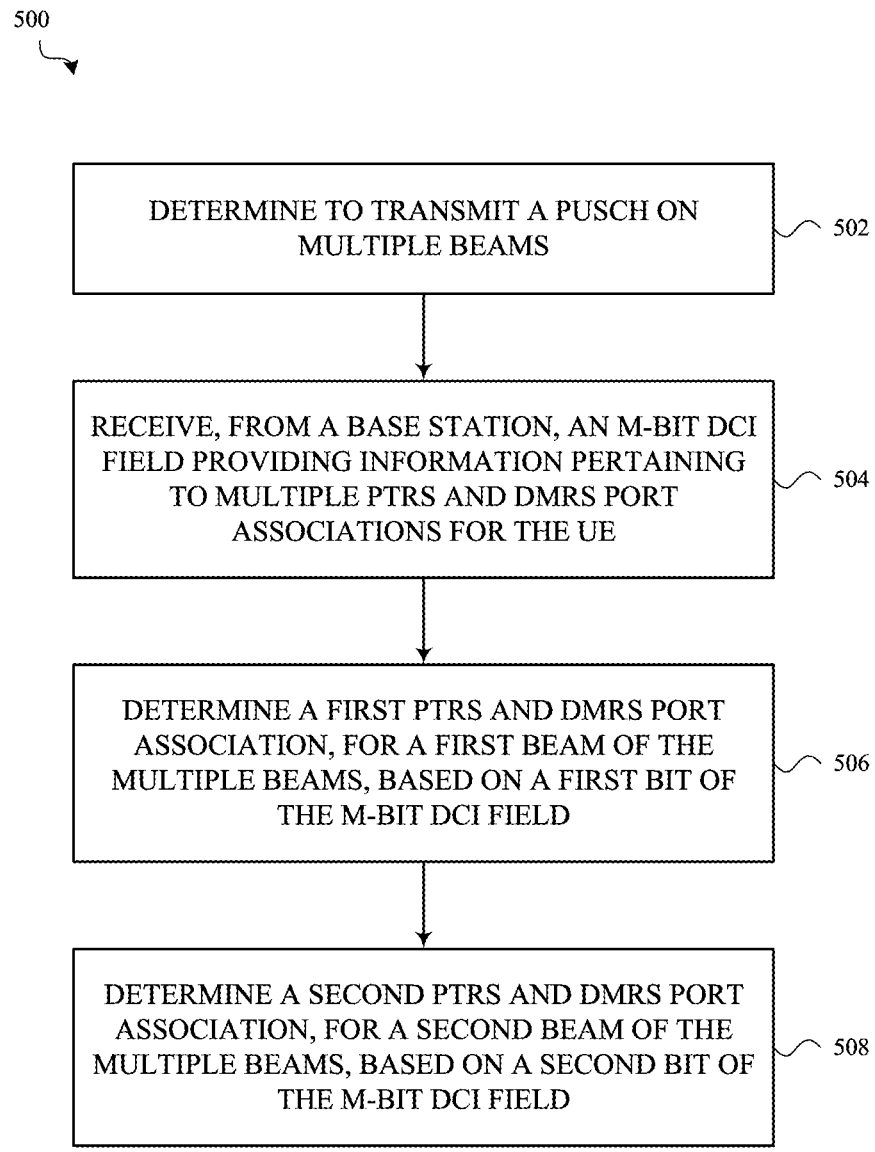
FIG. 5 illustrates a method of a UE, according to an embodiment.

FIG. 5 illustrates a method of a UE, according to an embodiment. The method 500 includes determining 502 to transmit a PUSCH on multiple beams. In some cases, the UE may then transmit and receive various types of information to/from a base station (e.g., a gNB, and in some cases a gNB operating as a serving cell for the UE) following a determination to transmit a PUSCH on multiple beams. For example, the UE may transmit and receive information as described with reference to FIG. 4. Not all of these transmissions and receptions are described with reference to FIG. 5, but it is noted that they may occur.

Before or after determining 502 to transmit a PUSCH on multiple beams, the method 500 may include receiving 504, from the base station, an M-bit DCI field providing information pertaining to multiple PTRS and DMRS port associations for the UE. The M-bit field may in some cases be a 2-bit field and, in some cases, may be the 2-bit field discussed above and described in 3GPP TS 38.212, sections 7.3.1.1.2 and 7.3.1.1.3. In some cases, the M-bit field may have more than two bits. For example, the M-bit field may have M bits corresponding to M beams on which a UE may transmit a PUSCH.

The method 500 may further include determining 506 a first PTRS and DMRS port association, for a first beam of the multiple beams, based on a first bit of the M-bit DCI field, and determining 508 a second PTRS and DMRS port association, for a second beam of the multiple beams, based on a second bit of the M-bit DCI field.

In order to appropriately apply the information pertaining to multiple PTRS and DMRS port associations, received from the base station at 504, the UE needs to appropriately identify the beams to which the information applies. For example, the UE needs to make sure that the first PTRS and DMRS port association is applied to the first beam and not the second beam, and make sure that the second PTRS and DMRS port association is applied to the second beam and not the first beam. Described below are various ways to do this.

In some cases, the UE may identify the first beam and the second beam based on a time domain order of the first beam and the second beam. In some cases, the time domain order of the first beam and the second beam may be determined based on which of the first beam or the second beam applies for an earlier PUSCH repetition. For example, the first beam may be the beam that applies for the first PUSCH repetition, and the second beam may be the beam that applies for the second PUSCH repetition.

In some cases, the method 500 may further include receiving a first SRI and receiving a second SRI. In these cases, the UE may identify the first beam based on a first indication in the first SRI, and the UE may identify the second beam based on a second indication in the second SRI. In some cases, the first SRI may be the SRI that is received first in time, or an SRI that appears in a predetermined portion of a field in DCI.

In some cases, the method 500 may further include receiving a first sounding reference signal (SRS) resource indicator (SRI) indicating a first SRS resource set, and receiving a second SRI indicating a second SRS resource set. The UE may then identify the first beam and the second beam based on a time domain order of the first SRS resource set and the second SRS resource set.

In the rank>2 case, the M-bit DCI field (and especially a 2-bit DCI field) may not be able to fully specify the first and second PTRS and DMRS port associations. In these embodiments, a set of DMRS ports of the UE (e.g., a set of DMRS ports that share a same PTRS port) may be divided into more than one DMRS port group. For example, when a PTRS and DMRS port association for a beam is indicated by a single bit having two states, the set of DMRS ports may be divided into two DMRS port groups—a first DMRS port group and a second DMRS port group. The UE may then determine the first PTRS and DMRS port association, at 506, by selecting a first DMRS port, for the first PTRS and DMRS port association, 1) from the first DMRS port group when the first bit has a first value, and 2) from the second DMRS port group when the first bit has a second value. Similarly, the UE may determine the second PTRS and DMRS port association, at 508, by selecting a second DMRS port, for the second PTRS and DMRS port association, 1) from the first DMRS port group when the second bit has the first value, and 2) from the second DMRS port group when the second bit has the second value.

The set of DMRS ports of the UE may be divided into first and second DMRS port groups in various ways. In one embodiment, the first and second DMRS port groups may be configured by higher layer signaling. For example, the UE may receive a DMRS port assignment indication in higher layer signaling (e.g., in RRC signaling), and the UE may divide the set of DMRS ports between the first DMRS port group and the second DMRS port group according to the DMRS port assignment indication.

In another embodiment, the set of DMRS ports may be divided between the first DMRS port group and the second DMRS port group based on a predefined algorithm stored at the UE. In some cases, performing the predefined algorithm may include assigning a first set of ceil(N/2) DMRS ports (e.g., DMRS ports having lower port numbers) to one of the first DMRS port group or the second DMRS port group, and assigning a second set of DMRS ports, having higher port numbers than the first set of DMRS ports (e.g., the remaining DMRS ports), to the other of the first DMRS port group or the second DMRS port group. In the above algorithm, ceil is a ceiling function and N is a total number of available DMRS ports. As another example, performing the predefined algorithm may include assigning even numbered DMRS ports to one of the first DMRS port group or the second DMRS port group, and assigning odd numbered DMRS ports to the other of the first DMRS port group or the second DMRS port group.

When more than one DMRS port (i.e., a plurality of DMRS ports) is assigned to a DMRS port group, an agreed upon method for selecting a particular DMRS port from among the plurality of DMRS ports may be needed. Various ways of selecting a particular DMRS port are described below.

In some cases, a method for selecting a DMRS port from among a plurality of DMRS ports in a DMRS port group may be predefined. That is, the selection may be predefined. In some cases, the selection of the DMRS port may be predefined as a DMRS port having a lowest port index in the DMRS port group. This type of "predefined selection" method may be applied when selecting the first DMRS port for the first PTRS and DMRS port association (determined at 506), and/or when selecting the second DMRS port for the second PTRS and DMRS port association (determined at 508).

In some cases, the DMRS port to be selected from among a plurality of DMRS ports in a DMRS port group may be configured by higher layer signaling (e.g., RRC signaling). For example, the UE may receive a first DMRS port selection indication in higher layer signaling and select the first DMRS port from among a plurality of DMRS ports in the first DMRS port group or the second DMRS port group based on the first DMRS port selection indication. Similarly, the UE may receive a second DMRS port selection indication in higher layer signaling and select the second DMRS port from among the plurality of DMRS ports in the first DMRS port group or the second DMRS port group based on the second DMRS port selection indication.

In some cases, the DMRS port to be selected from among a plurality of DMRS ports in a DMRS port group may be selected based on a PUSCH repetition index. The DMRS port may be selected based on a PUSCH repetition index for a single beam, or based on a PUSCH repetition index across all of the multiple beams on which PUSCH repetitions are transmitted. In one example, if the number of DMRS ports in a DMRS port group is K, the UE may select a DMRS port, for association with a PTRS port for PUSCH repetition index x, using the formula {(x+delta) mod K}, where delta is, for example, predefined (e.g., as 0, 1, or any integer number) or configured by higher layer signaling (e.g., RRC signaling). The value of delta may be different for different beams. The PUSCH repetition index may be updated based on nominal PUSCH repetition or actual PUSCH repetition. An example of the DMRS port selection method described in this paragraph is described in further detail with reference to FIG. 7.

In some cases, the DMRS port to be selected from among a plurality of DMRS ports in a DMRS port group may be selected in accord with a DMRS port selection method indication received in higher layer signaling (e.g., RRC signaling). For example, the first DMRS port may be selected, for the first PTRS and DMRS port association and first beam, from among a plurality of DMRS ports in one of the first DMRS port group or the second DMRS port group, using a first DMRS port selection method indicated by a first DMRS port selection method indication. Similarly, the second DMRS port may be selected, for the second PTRS and DMRS port association and second beam, from among a plurality of DMRS ports in one of the first DMRS port group or the second DMRS port group, using a second DMRS port selection method indicated by a second DMRS port selection method indication. The first and second DMRS port selection methods, for the respective first and second PTRS and DMRS port associations, may be the same method or different methods. In some cases, a DMRS port selection method indication may indicate either 1) a first method in which a predefined DMRS port in the plurality of DMRS ports is selected as the first DMRS port, or 2) a second method in which a DMRS port is selected based on a PUSCH repetition index.

In 3GPP Rel-17, provisions have been made for some PTRS time/frequency densities to be determined by a threshold configured by RRC signaling (see, e.g., 3GPP TS 38.214, section 6.2.3). For example, section 6.2.3 describes the use of thresholds to specify a minimum frequency density, time density, and/or sample density. However, when a UE transmits a PUSCH on multiple beams, different beams may be targeted for reception by different base stations (e.g., different gNBs). As a result, the best PTRS time/frequency density (hereafter referred to as PTRS density) can differ for the different base stations (e.g., because of different phase noise levels). Various methods for determining the PTRS densities for multiple beams are therefore described below.

In a first example, the UE may receive, from a base station, a first indication of PTRS density for a first beam and a second indication of PTRS density for a second beam (or for any number of beams). Each indication of PTRS density may include one or more of a frequency density, a time density, or a sample density. In a second example, the UE may receive, from a base station, an indication of PTRS density for a first beam. The UE may then use a default PTRS density for a second beam (e.g., the PTRS density for the second beam may be based on the default thresholds defined in 3GPP TS 38.214, section 6.3.2 for a PUSCH transmission on a single beam). In a third example, the UE may receive, from a base station, a first indication of PTRS density for a first beam. The UE may then use, for a second beam, a PTRS density indicated by the indication of PTRS density for the first beam.

Figure 6:
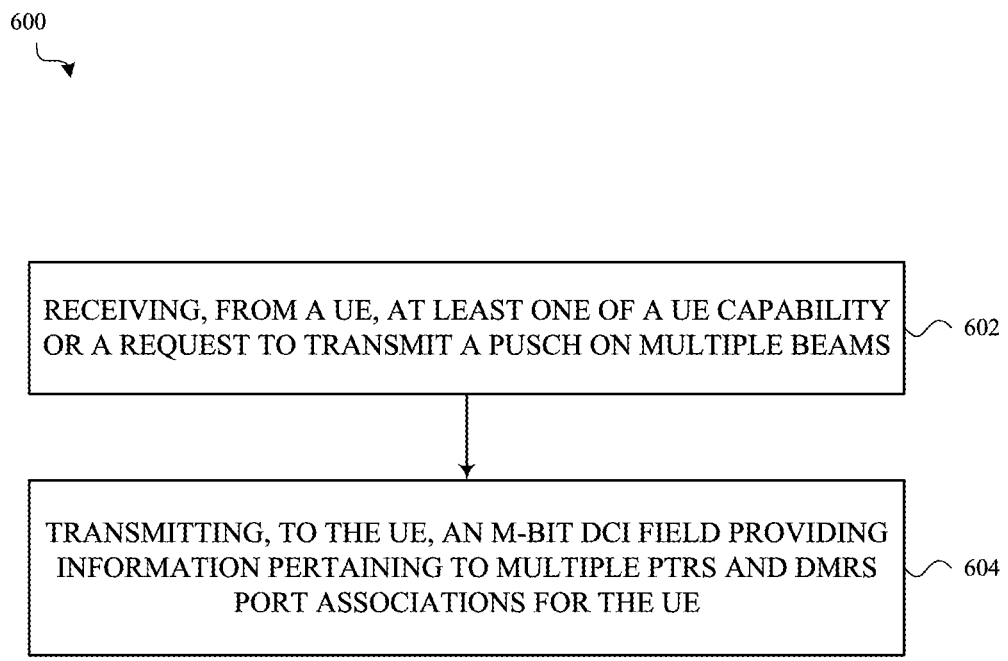
FIG. 6 illustrates a method of a base station (e.g., a gNB), according to an embodiment.

FIG. 6 illustrates a method of a base station (e.g., a gNB), according to an embodiment. The method 600 includes receiving 602, from a UE, at least one of a UE capability or a request to transmit a PUSCH on multiple beams. In some cases, the base station may then transmit and receive various types of information to/from the UE. For example, the base station may transmit and receive information as described with reference to FIG. 4. Not all of these transmissions and receptions are described with reference to FIG. 6, but it is noted that they may occur.

Before or after receiving 602 receiving at least one of the UE capability or the request to transmit the PUSCH on multiple beams, the method 600 may include transmitting 604, to the UE, an M-bit DCI field providing information pertaining to multiple PTRS and DMRS port associations for the UE. The M-bit field may in some cases be a 2-bit field and, in some cases, may be the 2-bit field discussed above and described in 3GPP TS 38.212, sections 7.3.1.1.2 and 7.3.1.1.3. In these cases, the same 2-bit field may be used, at different times, to indicate PTRS and DMRS port associations for single beam PUSCH transmissions and/or PUSCH transmissions associated with different PTRS ports. In some cases, the M-bit field may have more than two bits. For example, the M-bit field may have M bits corresponding to M beams on which a UE may transmit a PUSCH. A first bit of the M-bit DCI field may provide information pertaining to a first PTRS and DMRS port association, for a first beam of the multiple beams. A second bit of the M-bit DCI field may provide information pertaining to a second PTRS and DMRS port association, for a second beam of the multiple beams.

To enable the UE to appropriately apply the information pertaining to multiple PTRS and DMRS port associations transmitted by the base station, at 604, the base station and UE need to have a predefined or specified way for the UE to appropriately identify the beams to which the information applies. The predefined or specified ways may include any of the ways described with reference to FIG. 5.

In a rank>2 case, the M-bit DCI field (and especially a 2-bit DCI field) may not be able to fully specify the first and second PTRS and DMRS port associations. In these embodiments, a set of DMRS ports of the UE (e.g., a set of DMRS ports that share a same PTRS port) may be divided into more than one DMRS port group. Various methods for dividing the DMRS ports of a UE into different DMRS port groups are described with reference to FIG. 5. In some embodiments, the base station may transmit to the UE, in higher layer signaling (e.g., RRC signaling), a DMRS port assignment indication. The DMRS port assignment indication may indicate a division of DMRS ports, of the UE, between a first DMRS port group and a second DMRS port group.

When more than one DMRS port (i.e., a plurality of DMRS ports) is assigned to a DMRS port group, an agreed upon method for selecting a particular DMRS port from among the plurality of DMRS ports may be needed. Various ways of indicating how a UE is to select a particular DMRS port are described with reference to FIG. 5.

In some cases, the base station may transmit to the UE, in higher layer signaling (e.g., RRC signaling), a first DMRS port selection indication that indicates a DMRS port for the UE to select when the UE selects a first DMRS port from a first DMRS port group. The base station may also or alternatively transmit to the UE, in the higher layer signaling, a second DMRS port selection indication that indicates a DMRS port for the UE to select when the UE selects a second DMRS port from a second DMRS port group.

In some cases, the base station may transmit to the UE, in higher layer signaling (e.g., RRC signaling), a DMRS port selection method indication. The DMRS port selection method indication may indicate one of a plurality of methods for the UE to use when selecting a DMRS port, from among a plurality of DMRS ports in a DMRS port group, for a PTRS and DMRS port association. In some cases, the base station may transmit a first DMRS port selection method indication and a second DMRS port selection method indication. The first DMRS port selection method indication may be used by the UE to select a first DMRS port, for a first PTRS and DMRS port association and first beam, from among a plurality of DMRS ports in one of the first DMRS port group or the second DMRS port group. The second DMRS port selection method indication may be used by the UE to select a second DMRS port, for a second PTRS and DMRS port association and second beam, from among a plurality of DMRS ports in one of the first DMRS port group or the second DMRS port group.

In 3GPP Rel-17, provisions have been made for some PTRS time/frequency densities to be determined by a threshold configured by RRC signaling (see, e.g., 3GPP TS 38.214, section 6.2.3). However, when a UE transmits a PUSCH on multiple beams, different beams may be targeted for reception by different base stations (e.g., different gNBs). Various methods for determining the PTRS densities for multiple beams are therefore described below.

In a first example, the base station may transmit, to the UE, a first indication of PTRS density for a first beam and a second indication of PTRS density for a second beam (or for any number of beams). Each indication of PTRS density may include one or more of a frequency density, a time density, or a sample density. In a second example, the base station may transmit, to the UE, an indication of PTRS density for a first beam. The UE may then use a default PTRS density for the second beam. In a third example, the base station may transmit, to the UE, a first indication of PTRS density for a first beam. The UE may then use, for a second beam, a PTRS density indicated by the indication of PTRS density for the first beam.

Figure 7:
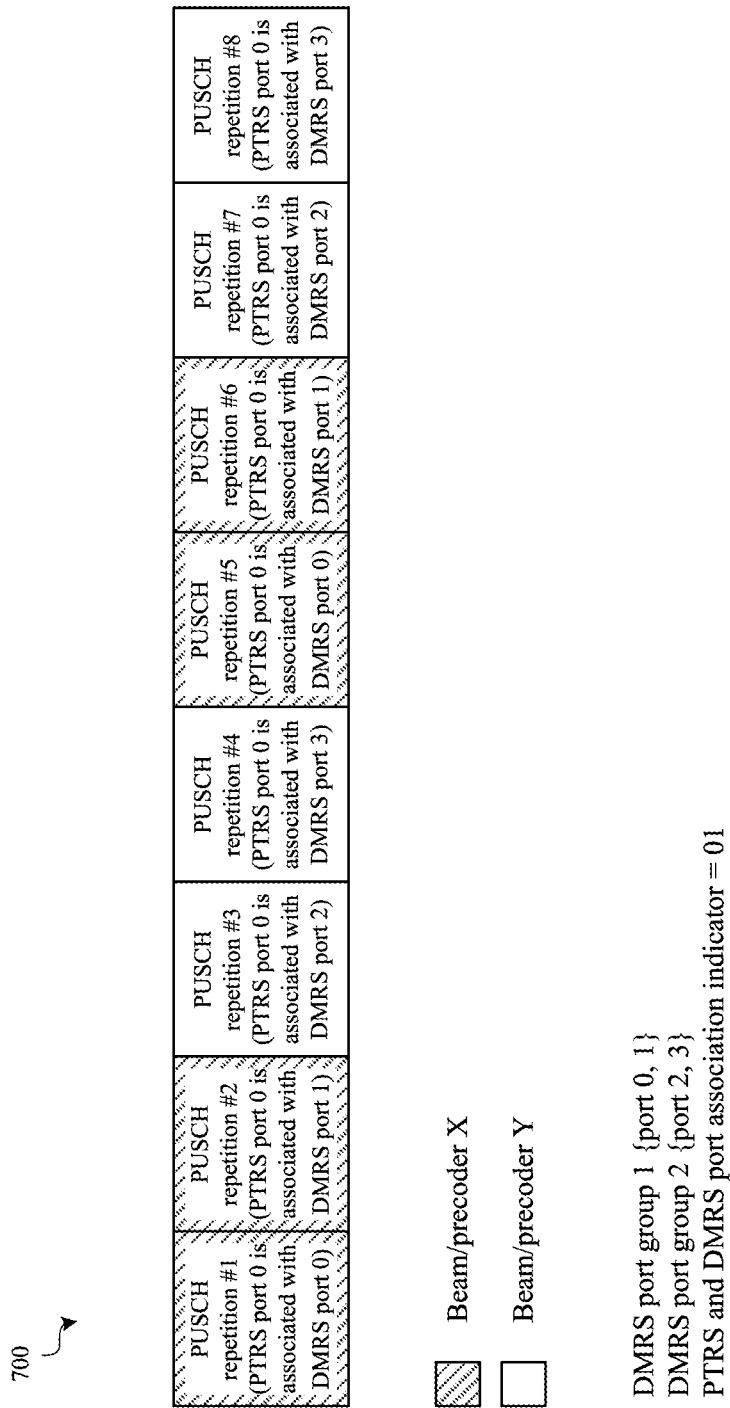
FIG. 7 illustrates an example of a DMRS port selection method described with reference to FIG. 5.

FIG. 7 illustrates an example of a DMRS port selection method described with reference to FIG. 5. The DMRS port selection method is based on a PUSCH repetition index across all beams. As shown, a UE may transmit a plurality of PUSCH repetitions 700, identified as PUSCH repetitions #1-#8. The PUSCH is transmitted on first and second beams, with PUSCH repetitions #1, #2, #5, and #6 being transmitted on the first beam, and with PUSCH repetitions #3, #4, #7, and #8 being transmitted on the second beam. The PUSCH repetitions transmitted on the first beam may be transmitted using a precoder X, and the PUSCH repetitions transmitted on the second beam may be transmitted using a precoder Y.

By way of example, the UE may receive a 2-bit DCI field having the value "01". The value "0" in the MSB position may indicate that a DMRS port should be selected for a first PTRS and DMRS port association, for the first beam, from a first DMRS port group. The value "1" in the LSB position may indicate that a DMRS port should be elected for a second PTRS and DMRS port association, for the second beam, from a second DMRS port group. The first DMRS port group may include DMRS ports 0 and 1, and the second DMRS port group may include DMRS ports 2 and 3. When DMRS ports are selected based on a PUSCH repetition index across all beams, given the above conditions, PTRS port 0 may be associated with DMRS port 0 for PUSCH repetition #1 on the first beam (beam X); PTRS port 0 may be associated with DMRS port 1 for PUSCH repetition #2 on the first beam; PTRS port 0 may be associated with DMRS port 2 for PUSCH repetition #3 on the second beam (beam Y); PTRS port 0 may be associated with DMRS port 3 for PUSCH repetition #4 on the second beam; PTRS port 0 may be associated with DMRS port 0 for PUSCH repetition #5 on the first beam; PTRS port 0 may be associated with DMRS port 1 for PUSCH repetition #6 on the first beam; PTRS port 0 may be associated with DMRS port 2 for PUSCH repetition #7 on the second beam; and PTRS port 0 may be associated with DMRS port 3 for PUSCH repetition #8 on the second beam.

For a rank>2 multi-beam NCB based PUSCH transmission, a UE may alternatively determine PTRS and DMRS port associations, for each of first and second beams on which the UE may transmit PUSCH repetitions, independently of any PTRS and DMRS port associations indicated by a base station. Some of the ways this may be done are described with reference to FIG. 8.

Figure 8:
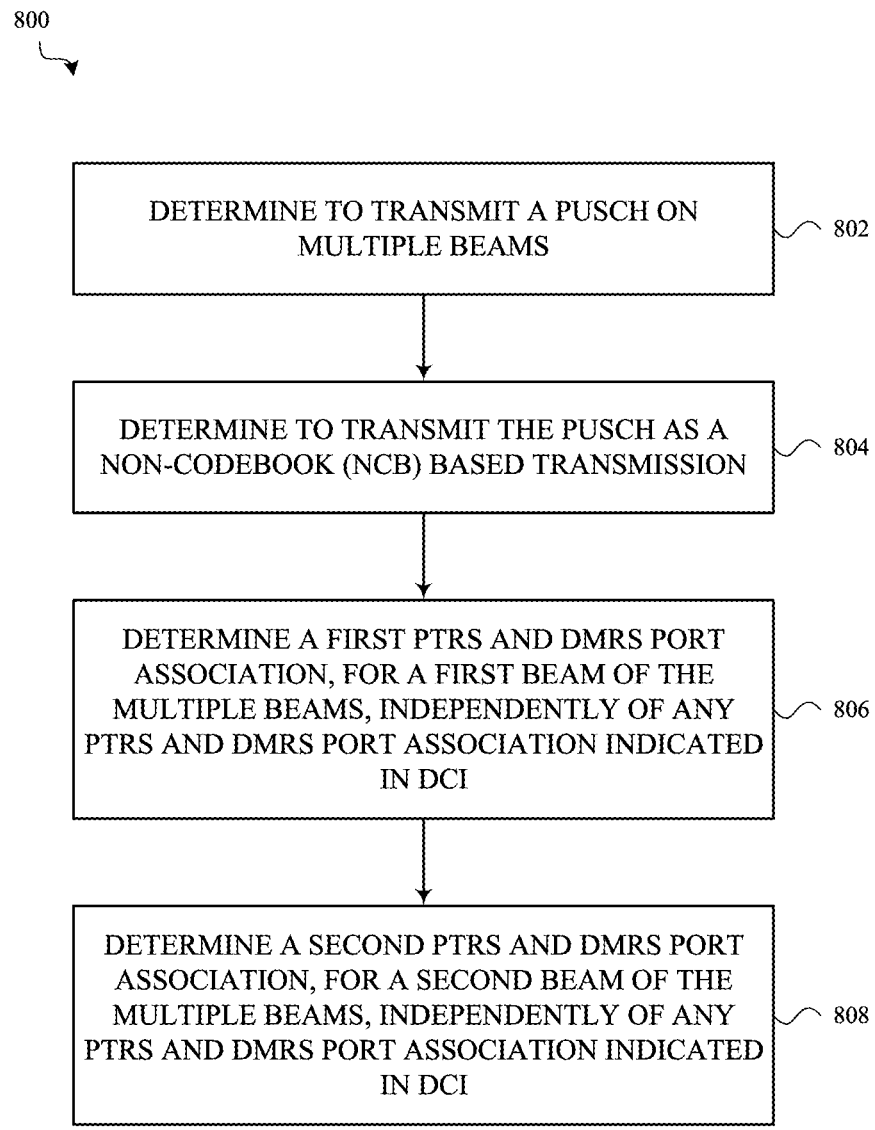
FIG. 8 illustrates a method of a UE, according to an embodiment.

FIG. 8 illustrates a method of a UE, according to an embodiment. The method 800 includes determining 802 to transmit a PUSCH on multiple beams, and determining 804 to transmit the PUSCH as an NCB based transmission. In some cases, the UE may then transmit and receive various types of information to/from a base station (e.g., a gNB, and in some cases a gNB operating as a serving cell for the UE) following is determination to transmit a PUSCH on multiple beams. For example, the UE may transmit and receive information as described with reference to FIG. 4. Not all of these transmissions and receptions are described with reference to FIG. 8, but it is noted that they may occur.

The method 800 may further include determining 806 a first PTRS and DMRS port association, for a first beam of the multiple beams, independently of any PTRS and DMRS port association indicated in DCI, and determining 808 a second PTRS and DMRS port association, for a second beam of the multiple beams, independently of any PTRS and DMRS port association indicated in DCI.

In some embodiments of the method 800, determining 806 the first PTRS and DMRS port association may include selecting a first DMRS port for the first PTRS and DMRS port association as a DMRS port having a lowest port index among DMRS ports that share the PTRS port of the first PTRS and DMRS port association. In some cases, the UE may receive, from a base station, an SRI mapping order. In this case, the UE may determine 806 the first PTRS and DMRS port association based on the SRI mapping order, or by ignoring the SRI mapping order and adjusting a DMRS port and SRI mapping order to provide a DMRS port associated with a best precoder with the lowest port index. The second PTRS and DMRS port association may be determined 808 similarly to the first PTRS and DMRS port association.

In some embodiments of the method 800, the UE may receive, in RRC signaling transmitted by a base station, an indication that the UE is allowed to determine the first PTRS and DMRS port association and the second PTRS and DMRS port association independently of any PTRS and DMRS port association indicated in DCI. In this manner, the UE may be enabled to perform one or more of the operations 804-808. The base station may enable one or more of the operations 804-808 based on the UE's capability.

In some embodiments of the method 800, prior to determining 806 the first PTRS and DMRS port association independently of any PTRS and DMRS port association indicated in DCI, the UE may determine a channel state information reference signal (CSI-RS) associated with the first beam is configured for an SRS resource set for NCB based transmission. In this manner, the UE may be enabled to perform the operation 806. Similarly, prior to determining 808 the second PTRS and DMRS port association independently of any PTRS and DMRS port association indicated in DCI, the UE may determine a channel state information reference signal (CSI-RS) associated with the second beam is configured for an SRS resource set for NCB based transmission. In this manner, the UE may be enabled to perform the operation 808. In some cases, a base station may configure an SRS resource set (or sets) for NCB based transmission based on the UE's capability.

In some embodiments of the method 800, prior to determining the first or second PTRS and DMRS port association independently of any PTRS and DMRS port association indicated in DCI, the UE may determine that it is transmitting a PUSCH (or determine that it is able to transmit the PUSCH) with a rank greater than two. If not, the UE may determine the first and second PTRS and DMRS port associations based on PTRS and DMRS port associations indicated by a base station in DCI.

In conjunction with performing the method 800. PTRS densities for multiple beams may be indicated and/or determined in any of the ways described with reference to FIG. 5.

Figure 9:
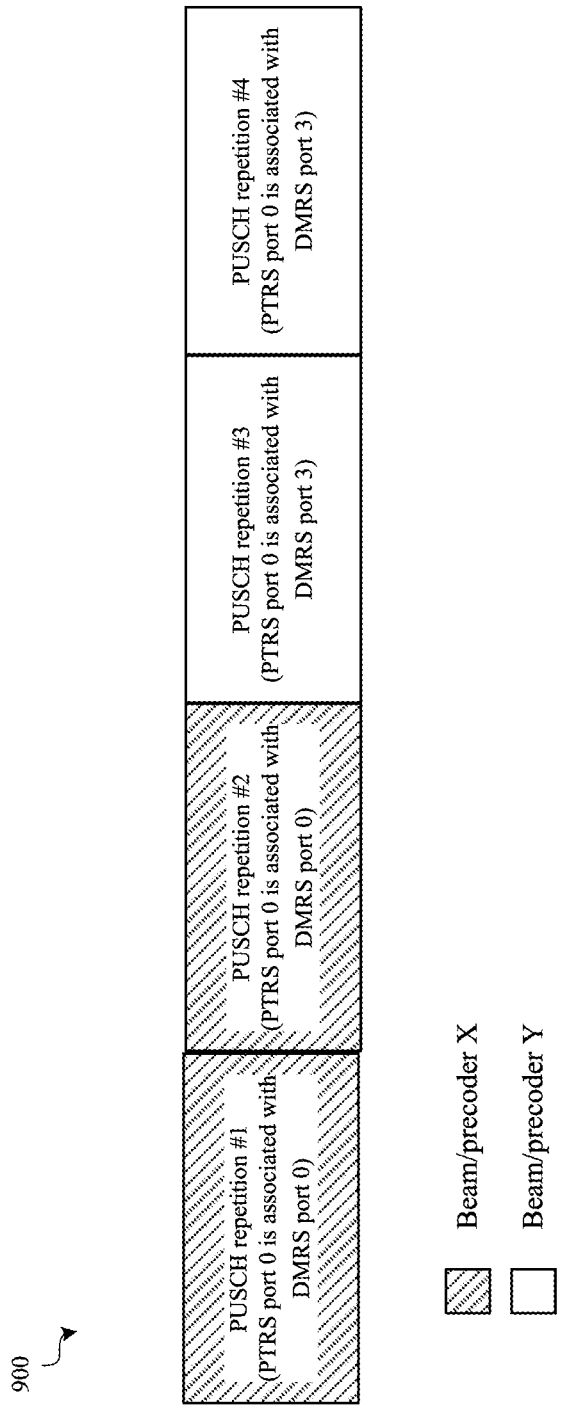
FIG. 9 illustrates an example non-codebook (NCB) based transmission of a PUSCH on multiple beams.

FIG. 9 illustrates an example NCB based transmission of a PUSCH on multiple beams. As shown, a UE may transmit a plurality of PUSCH repetitions, identified as PUSCH repetitions #1-#4. The PUSCH is transmitted on first and second beams, with PUSCH repetitions #1 and #2 being transmitted on the first beam, and with PUSCH repetitions #3 and #4 being transmitted on the second beam. The PUSCH repetitions transmitted on the first beam may be transmitted using a precoder X, and the PUSCH repetitions transmitted on the second beam may be transmitted using a precoder Y.

By way of example, the UE may receive, from a base station, a first SRI mapping order for the first beam (Beam X) of {SRI 0, 1}. The UE may determine that the quality of SRI 0>SRI 1, and use a DMRS to SRI mapping order of {0, 1}. The UE may receive, from the base station, a second SRI mapping order for the second beam (Beam Y) of {SRI 2, 3}. However, the UE may determine that the quality of SRI 2<SRI 3, and use a DMRS to SRI mapping order of {3, 2} instead of the base station's request for a DMRS to SRI mapping order of {2, 3}.

Given the DMRS to SRI mapping orders determined by the UE for the first beam and the second beam, the UE may: associate PTRS port 0 with DMRS port 0 for PUSCH repetition #1 on the first beam (beam X); associate PTRS port 0 with DMRS port 0 for PUSCH repetition #2 on the first beam; associate PTRS port 0 with DMRS port 3 for PUSCH repetition #3 on the second beam (beam Y); and associate PTRS port 0 with DMRS port 3 for PUSCH repetition #4 on the second beam.

Embodiments contemplated herein include an apparatus having means to perform one or more elements of the flow or method 400, 500, 600, or 800. In the context of flow or method 400, 500, or 800, this apparatus may be, for example, an apparatus of a UE (such as a wireless device 1102 that is a UE, as described herein). In the context of flow or method 400 or 600, this apparatus may be, for example, an apparatus of a base station (such as a network device 1120 that is a base station, as described herein).

Embodiments contemplated herein include one or more non-transitory computer-readable media storing instructions to cause an electronic device, upon execution of the instructions by one or more processors of the electronic device, to perform one or more elements of the flow or method 400, 500, 600, or 800. In the context of flow or method 400, 500, or 800, this non-transitory computer-readable media may be, for example, a memory of a UE (such as a memory 1106 of a wireless device 1102 that is a UE, as described herein). In the context of flow or method 400 or 600, this non-transitory computer-readable media may be, for example, a memory of a base station (such as a memory 1124 of a network device 1120 that is a base station, as described herein).

Embodiments contemplated herein include an apparatus having logic, modules, or circuitry to perform one or more elements of the flow or method 400, 500, 600, or 800. In the context of flow or method 400, 500, or 800, this apparatus may be, for example, an apparatus of a UE (such as a wireless device 1102 that is a UE, as described herein). In the context of flow or method 400 or 600, this apparatus may be, for example, an apparatus of a base station (such as a network device 1120 that is a base station, as described herein).

Embodiments contemplated herein include an apparatus having one or more processors and one or more computer-readable media, using or storing instructions that, when executed by the one or more processors, cause the one or more processors to perform one or more elements of the method 400, 500, 600, or 800. In the context of flow or method 400, 500, or 800, this apparatus may be, for example, an apparatus of a UE (such as a wireless device 1102 that is a UE, as described herein). In the context of flow or method 400 or 600, this apparatus may be, for example, an apparatus of a base station (such as a network device 1120 that is a base station, as described herein).

Embodiments contemplated herein include a signal as described in or related to one or more elements of the flow or method 400, 500, 600, or 800.

Embodiments contemplated herein include a computer program or computer program product having instructions, wherein execution of the program by a processor causes the processor to carry out one or more elements of the flow or method 400, 500, 600, or 800. In the context of flow or method 400, 500, or 800, the processor may be a processor of a UE (such as a processor(s) 1104 of a wireless device 1102 that is a UE, as described herein), and the instructions may be, for example, located in the processor and/or on a memory of the UE (such as a memory 1106 of a wireless device 1102 that is a UE, as described herein). In the context of flow or method 400 or 600, the processor may be a processor of a base station (such as a processor(s) 1122 of a network device 1120 that is a base station, as described herein), and the instructions may be, for example, located in the processor and/or on a memory of the base station (such as a memory 1124 of a network device 1120 that is a base station, as described herein).

Figure 10:
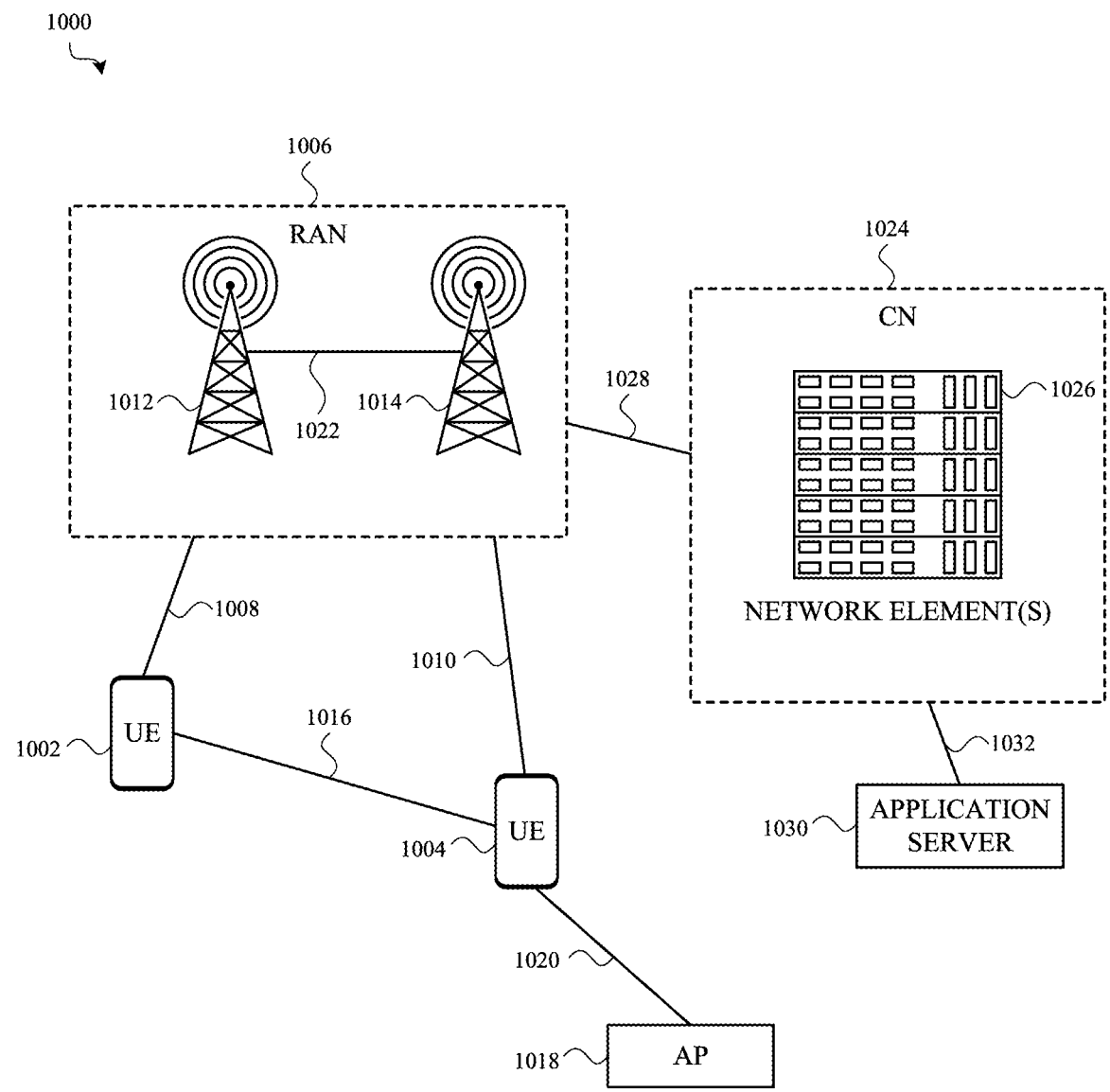
FIG. 10 illustrates an example architecture of a wireless communication system, according to embodiments disclosed herein.

FIG. 10 illustrates an example architecture of a wireless communication system 1000, according to embodiments disclosed herein. The following description is provided for an example wireless communication system 1000 that operates in conjunction with the LTE system standards and/or 5G or NR system standards as provided by 3GPP technical specifications.

As shown by FIG. 10, the wireless communication system 1000 includes UE 1002 and UE 1004 (although any number of UEs may be used). In this example, the UE 1002 and the UE 1004 are illustrated as smartphones (e.g., handheld touchscreen mobile computing devices connectable to one or more cellular networks), but may also comprise any mobile or non-mobile computing device configured for wireless communication.

The UE 1002 and UE 1004 may be configured to communicatively couple with a RAN 1006. In embodiments, the RAN 1006 may be NG-RAN, E-UTRAN, etc. The UE 1002 and UE 1004 utilize connections (or channels) (shown as connection 1008 and connection 1010, respectively) with the RAN 1006, each of which comprises a physical communications interface. The RAN 1006 can include one or more base stations, such as base station 1012 and base station 1014, that enable the connection 1008 and connection 1010.

In this example, the connection 1008 and connection 1010 are air interfaces to enable such communicative coupling, and may be consistent with RAT(s) used by the RAN 1006, such as, for example, an LTE and/or NR.

In some embodiments, the UE 1002 and UE 1004 may also directly exchange communication data via a sidelink interface 1016. The UE 1004 is shown to be configured to access an access point (shown as AP 1018) via connection 1020. By way of example, the connection 1020 can comprise a local wireless connection, such as a connection consistent with any IEEE 802.11 protocol, wherein the AP 1018 may comprise a Wi-Fi® router. In this example, the AP 1018 may be connected to another network (for example, the Internet) without going through a CN 1024.

In embodiments, the UE 1002 and UE 1004 can be configured to communicate using orthogonal frequency division multiplexing (OFDM) communication signals with each other or with the base station 1012 and/or the base station 1014 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1012 or base station 1014 may be implemented as one or more software entities running on server computers as part of a virtual network. In addition, or in other embodiments, the base station 1012 or base station 1014 may be configured to communicate with one another via interface 1022. In embodiments where the wireless communication system 1000 is an LTE system (e.g., when the CN 1024 is an EPC), the interface 1022 may be an X2 interface. The X2 interface may be defined between two or more base stations (e.g., two or more eNBs and the like) that connect to an EPC, and/or between two eNBs connecting to the EPC. In embodiments where the wireless communication system 1000 is an NR system (e.g., when CN 1024 is a 5GC), the interface 1022 may be an Xn interface. The Xn interface is defined between two or more base stations (e.g., two or more gNBs and the like) that connect to 5GC, between a base station 1012 (e.g., a gNB) connecting to 5GC and an eNB, and/or between two eNBs connecting to 5GC (e.g., CN 1024).

The RAN 1006 is shown to be communicatively coupled to the CN 1024. The CN 1024 may comprise one or more network elements 1026, which are configured to offer various data and telecommunications services to customers/subscribers (e.g., users of UE 1002 and UE 1004) who are connected to the CN 1024 via the RAN 1006. The components of the CN 1024 may be implemented in one physical device or separate physical devices including components to read and execute instructions from a machine-readable or computer-readable medium (e.g., a non-transitory machine-readable storage medium).

In embodiments, the CN 1024 may be an EPC, and the RAN 1006 may be connected with the CN 1024 via an S1 interface 1028. In embodiments, the S1 interface 1028 may be split into two parts, an S1 user plane (S1-U) interface, which carries traffic data between the base station 1012 or base station 1014 and a serving gateway (S-GW), and the S1-MME interface, which is a signaling interface between the base station 1012 or base station 1014 and mobility management entities (MMEs).

In embodiments, the CN 1024 may be a 5GC, and the RAN 1006 may be connected with the CN 1024 via an NG interface 1028. In embodiments, the NG interface 1028 may be split into two parts, an NG user plane (NG-U) interface, which carries traffic data between the base station 1012 or base station 1014 and a user plane function (UPF), and the S1 control plane (NG-C) interface, which is a signaling interface between the base station 1012 or base station 1014 and access and mobility management functions (AMFs).

Generally, an application server 1030 may be an element offering applications that use internet protocol (IP) bearer resources with the CN 1024 (e.g., packet switched data services). The application server 1030 can also be configured to support one or more communication services (e.g., VOIP sessions, group communication sessions, etc.) for the UE 1002 and UE 1004 via the CN 1024. The application server 1030 may communicate with the CN 1024 through an IP communications interface 1032.

Figure 11:
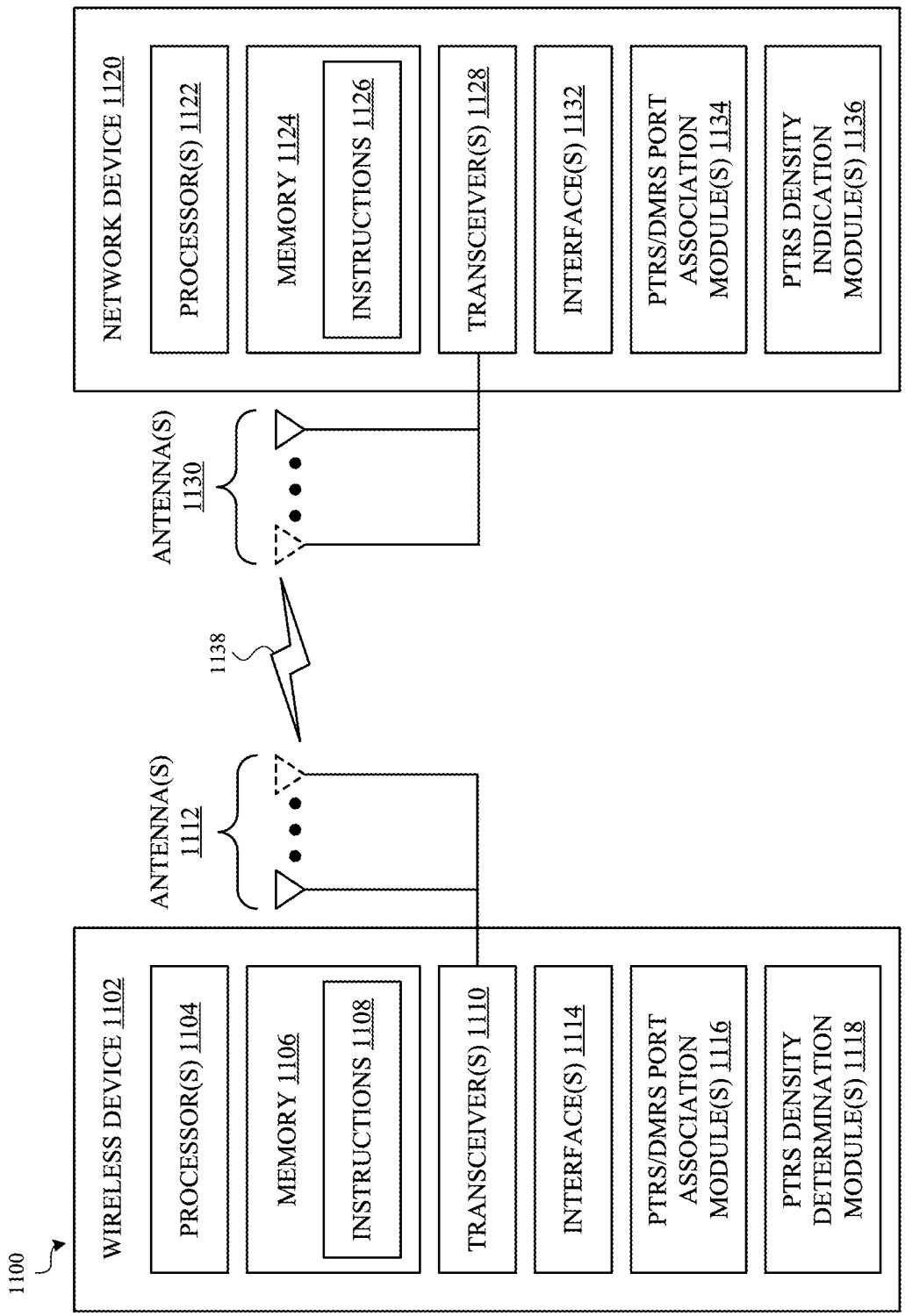
FIG. 11 illustrates a system for performing signaling between a wireless device and a network device, according to embodiments disclosed herein.

FIG. 11 illustrates a system 1100 for performing signaling 1138 between a wireless device 1102 and a network device 1120, according to embodiments disclosed herein. The system 1100 may be a portion of a wireless communications system as herein described. The wireless device 1102 may be, for example, a UE of a wireless communication system. The network device 1120 may be, for example, a base station (e.g., an eNB or a gNB) of a wireless communication system.

The wireless device 1102 may include one or more processor(s) 1104. The processor(s) 1104 may execute instructions such that various operations of the wireless device 1102 are performed, as described herein. The processor(s) 1104 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1102 may include a memory 1106. The memory 1106 may be a non-transitory computer-readable storage medium that stores instructions 1108 (which may include, for example, the instructions being executed by the processor(s) 1104). The instructions 1108 may also be referred to as program code or a computer program. The memory 1106 may also store data used by, and results computed by, the processor(s) 1104.

The wireless device 1102 may include one or more transceiver(s) 1110 that may include radio frequency (RF) transmitter and/or receiver circuitry that use the antenna(s) 1112 of the wireless device 1102 to facilitate signaling (e.g., the signaling 1138) to and/or from the wireless device 1102 with other devices (e.g., the network device 1120) according to corresponding RATs.

The wireless device 1102 may include one or more antenna(s) 1112 (e.g., one, two, four, or more). For embodiments with multiple antenna(s) 1112, the wireless device 1102 may leverage the spatial diversity of such multiple antenna(s) 1112 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1102 may be accomplished according to precoding (or digital beamforming) that is applied at the wireless device 1102 that multiplexes the data streams across the antenna(s) 1112 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1102 may implement analog beamforming techniques, whereby phases of the signals sent by the antenna(s) 1112 are relatively adjusted such that the (joint) transmission of the antenna(s) 1112 can be directed (this is sometimes referred to as beam steering).

The wireless device 1102 may include one or more interface(s) 1114. The interface(s) 1114 may be used to provide input to or output from the wireless device 1102. For example, a wireless device 1102 that is a UE may include interface(s) 1114 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1110/antenna(s) 1112 already described) that allow for communication between the UE and other devices and may operate according to known protocols (e.g., Wi-Fi®, Bluetooth®, and the like).

The wireless device 1102 may include a PTRS/DMRS port association module 1116 and/or a PTRS density determination module 1118. The PTRS/DMRS port association module 1116 and PTRS density determination module 1118 may be implemented via hardware, software, or combinations thereof. For example, the PTRS/DMRS port association module 1116 and PTRS density determination module 1118 may be implemented as a processor, circuit, and/or instructions 1108 stored in the memory 1106 and executed by the processor(s) 1104. In some examples, the PTRS/DMRS port association module 1116 and PTRS density determination module 1118 may be integrated within the processor(s) 1104 and/or the transceiver(s) 1110. For example, the PTRS/DMRS port association module 1116 and PTRS density determination module 1118 may be implemented by a combination of software components (e.g., executed by a DSP or a general processor) and hardware components (e.g., logic gates and circuitry) within the processor(s) 1104 or the transceiver(s) 1110.

The PTRS/DMRS port association module 1116 may be used for various aspects of the present disclosure, for example, aspects of FIG. 1 through FIG. 9. The PTRS/DMRS port association module 1116 may be configured to, for example, receive, determine, and/or apply PTRS and DMRS port associations received from another device (e.g., the network device 1120) and/or determined locally at the wireless device 1102.

The PTRS density determination module 1118 may be used for various aspects of the present disclosure, for example, aspects of FIG. 1 through FIG. 9. The PTRS density determination module 1118 may be configured to, for example, determine a PTRS density as described herein.

The network device 1120 may include one or more processor(s) 1122. The processor(s) 1122 may execute instructions such that various operations of the network device 1120 are performed, as described herein. The processor(s) 1104 may include one or more baseband processors implemented using, for example, a CPU, a DSP, an ASIC, a controller, an FPGA device, another hardware device, a firmware device, or any combination thereof configured to perform the operations described herein.

The network device 1120 may include a memory 1124. The memory 1124 may be a non-transitory computer-readable storage medium that stores instructions 1126 (which may include, for example, the instructions being executed by the processor(s) 1122). The instructions 1126 may also be referred to as program code or a computer program. The memory 1124 may also store data used by, and results computed by, the processor(s) 1122.

The network device 1120 may include one or more transceiver(s) 1128 that may include RF transmitter and/or receiver circuitry that use the antenna(s) 1130 of the network device 1120 to facilitate signaling (e.g., the signaling 1138) to and/or from the network device 1120 with other devices (e.g., the wireless device 1102) according to corresponding RATs.

The network device 1120 may include one or more antenna(s) 1130 (e.g., one, two, four, or more). In embodiments having multiple antenna(s) 1130, the network device 1120 may perform MIMO, digital beamforming, analog beamforming, beam steering, etc., as has been described.

The network device 1120 may include one or more interface(s) 1132. The interface(s) 1132 may be used to provide input to or output from the network device 1120. For example, a network device 1120 that is a base station may include interface(s) 1132 made up of transmitters, receivers, and other circuitry (e.g., other than the transceiver(s) 1128 and antenna(s) 1130 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1120 may include a PTRS/DMRS port association module 1134 and/or a PTRS density indication module 1136. The PTRS/DMRS port association module 1134 and PTRS density indication module 1136 may be implemented via hardware, software, or combinations thereof. For example, the PTRS/DMRS port association module 1134 and PTRS density indication module 1136 may be implemented as a processor, circuit, and/or instructions 1126 stored in the memory 1124 and executed by the processor(s) 1122. In some examples, the PTRS/DMRS port association module 1134 and PTRS density indication module 1136 may be integrated within the processor(s) 1122 and/or the transceiver(s) 1128. For example, the PTRS/DMRS port association module 1134 and PTRS density indication module 1136 may be implemented by a combination of software components (e.g., executed by a DSP or a general processor) and hardware components (e.g., logic gates and circuitry) within the processor(s) 1122 or the transceiver(s) 1128.

The PTRS/DMRS port association module 1134 may be used for various aspects of the present disclosure, for example, aspects of FIG. 1 through FIG. 9. The PTRS/DMRS port association module 1134 may be configured to, for example, determine or transmit PTRS and DMRS port associations to another device (e.g., the wireless device 1102).

The PTRS density indication module 1136 may be used for various aspects of the present disclosure, for example, aspects of FIG. 1 through FIG. 9. The PTRS density indication module 1136 may be configured to, for example, configure, determine, or indicate a PTRS density as described herein.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE), comprising:
    determining to transmit a physical uplink shared channel (PUSCH) on multiple beams;
    receiving, from a network device, a 2-bit downlink control information (DCI) field providing information pertaining to multiple phase tracking reference signal (PTRS) and demodulation reference signal (DMRS) port associations for the UE;
    determining a first PTRS and DMRS port association, for a first beam of the multiple beams, based on a first bit of the 2-bit DCI field; and determining a second PTRS and DMRS port association, for a second beam of the multiple beams, based on a second bit of the 2-bit DCI field.

2. The method of claim 1, further comprising:
identifying the first beam and the second beam based on a time domain order of the first beam and the second beam.

3. The method of claim 1, further comprising:
receiving a first sounding reference signal (SRS) resource indicator (SRI);
receiving a second SRI;
identifying the first beam based on a first indication in the first SRI; and
identifying the second beam based on a second indication in the second SRI.

4. The method of claim 1, further comprising:
receiving a first sounding reference signal (SRS) resource indicator (SRI) indicating a first SRS resource set;
receiving a second SRI indicating a second SRS resource set; and
identifying the first beam and the second beam based on a time domain order of the first SRS resource set and the second SRS resource set.

5. The method of claim 1, further comprising:
dividing a set of DMRS ports of the UE between a first DMRS port group and a second DMRS port group; wherein,
determining the first PTRS and DMRS port association based on the first bit of the 2-bit DCI field comprises,
selecting a first DMRS port, for the first PTRS and DMRS port association,
from the first DMRS port group when the first bit has a first value; and
from the second DMRS port group when the first bit has a second value.

6. The method of claim 5, wherein:
determining the second PTRS and DMRS port association based on the second bit of the 2-bit DCI field comprises,
selecting a second DMRS port, for the second PTRS and DMRS port association, from the first DMRS port group when the second bit has the first value; and
from the second DMRS port group when the second bit has the second value.

7. The method of claim 5, further comprising:
receiving a DMRS port assignment indication in higher layer signaling; wherein,
the set of DMRS ports is divided between the first DMRS port group and the second DMRS port group according to the DMRS port assignment indication.

8. The method of claim 5, wherein the set of DMRS ports is divided between the first DMRS port group and the second DMRS port group based on a predefined algorithm stored at the UE.

9. The method of claim 8, wherein performing the predefined algorithm comprises:
assigning a first set of ceil (N/2) DMRS ports, having lower port numbers, to one of the first DMRS port group or the second DMRS port group, where ceil is a ceiling function and N is a total number of available DMRS ports; and
assigning a second set of DMRS ports, having higher port numbers than the first set of DMRS ports, to the other of the first DMRS port group or the second DMRS port group.

10. The method of claim 5, wherein:
the first DMRS port is selected from among a plurality of DMRS ports in one of the first DMRS port group or the second DMRS port group; and
the selection of the first DMRS port, from among the plurality of DMRS ports in the one of the first DMRS port group or the second DMRS port group, is predefined as a DMRS port having a lowest port index in the one of the first DMRS port group or the second DMRS port group.

11. The method of claim 5, further comprising:
receiving a DMRS port selection indication in higher layer signaling; wherein,
the first DMRS port is selected from among a plurality of DMRS ports in one of the first DMRS port group or the second DMRS port group; and
the selection of the first DMRS port from among the plurality of DMRS ports in the first DMRS port group or the second DMRS port group is based on the DMRS port selection indication.

12. The method of claim 5, wherein:
the first DMRS port is selected from among a plurality of DMRS ports in one of the first DMRS port group or the second DMRS port group; and
the selection of the first DMRS port, from among the plurality of DMRS ports in the one of the first DMRS port group or the second DMRS port group, is based on a PUSCH repetition index.

13. The method of claim 5, further comprising:
receiving a DMRS port selection method indication in higher layer signaling; wherein,
the first DMRS port is selected from among a plurality of DMRS ports in one of the first DMRS port group or the second DMRS port group; and
the selection of the first DMRS port, from among the plurality of DMRS ports in the one of the first DMRS port group or the second DMRS port group, is selected using a DMRS port selection method indicated by the DMRS port selection method indication.

14. An apparatus comprising memory coupled to a processor, the processor configured to:
determine to transmit a physical uplink shared channel (PUSCH) on multiple beams using the transceiver;
determine to transmit the PUSCH as a non-codebook (NCB) based transmission;
determine a first phase tracking reference signal (PTRS) and demodulation reference signal (DMRS) port association, for a first beam of the multiple beams, independently of any PTRS and DMRS port association indicated in downlink control information (DCI); and
determine a second PTRS and DMRS port association, for a second beam of the multiple beams, independently of any PTRS and DMRS port association indicated in DCI.

15. The apparatus of claim 14, wherein determining the first PTRS and DMRS port association comprises:
selecting a first DMRS port for the first PTRS and DMRS port association as a DMRS port having a lowest port index among DMRS ports that share a PTRS port of the first PTRS and DMRS port association.

16. The apparatus of claim 14, wherein the processor is further configured to:
prior to determining the first PTRS and DMRS port association independently of any PTRS and DMRS port association indicated in DCI, determining a channel state information reference signal (CSI-RS) associated with the first beam is configured for a sounding reference signal (SRS) resource set for a non-codebook (NCB) based transmission.

17. A method of a network device, comprising:
receiving, from a user equipment (UE), at least one of a UE capability or a request to transmit a physical uplink shared channel (PUSCH) on multiple beams; and
transmitting, to the UE, a 2-bit downlink control information (DCI) field providing information pertaining to multiple phase tracking reference signal (PTRS) and demodulation reference signal (DMRS) port associations for the UE; wherein,
a first bit of the 2-bit DCI field provides information pertaining to a first PTRS and DMRS port association, for a first beam of the multiple beams; and
a second bit of the 2-bit DCI field provides information pertaining to a second PTRS and DMRS port association, for a second beam of the multiple beams.

18. The method of claim 17, further comprising:
transmitting to the UE, in higher layer signaling, a DMRS port assignment indication; wherein,
the DMRS port assignment indication indicates a division of DMRS ports, of the UE, between a first DMRS port group and a second DMRS port group.

19. The method of claim 17, further comprising:
transmitting to the UE, in higher layer signaling, a DMRS port selection indication; wherein,
a set of DMRS ports of the UE is divided between a first DMRS port group and a second DMRS port group; and
the DMRS port selection indication indicates a first DMRS port for the UE to select when the UE selects a DMRS port from the first DMRS port group.

20. The method of claim 17, further comprising:
transmitting to the UE, in higher layer signaling, a DMRS port selection method indication; wherein,
the DMRS port selection method indication indicates one of a plurality of methods for the UE to use when selecting the first PTRS and DMRS port association.

* * * * *